(12) United States Patent
Allen et al.

(10) Patent No.: US 6,358,381 B1
(45) Date of Patent: Mar. 19, 2002

(54) RHODIUM ELECTROCATALYST AND METHOD OF PREPARATION

(75) Inventors: Robert J. Allen, Saugus; James R. Giallombardo, Beverly; Daniel Czerwiec, Wellesley; Emory S. De Castro, Nahant; Khaleda Shaikh, Concord, all of MA (US)

(73) Assignee: De Nora S.p.A. (IT)

( * ) Notice: Subject to any disclaimer, the term of this patent is extended or adjusted under 35 U.S.C. 154(b) by 0 days.

(21) Appl. No.: 09/616,753

(22) Filed: Jul. 14, 2000

Related U.S. Application Data

(63) Continuation of application No. 09/320,900, filed on May 27, 1999, now Pat. No. 6,149,782.

(51) Int. Cl.$^7$ ............................................... C25B 11/03
(52) U.S. Cl. ..................... 204/283; 704/284; 502/101; 502/104; 502/105; 502/223; 502/230
(58) Field of Search ............................... 204/283, 284; 502/101, 104, 105, 223, 230

(56) References Cited

U.S. PATENT DOCUMENTS 4,690,912 A * 9/1987 Paulik et al. ................ 502/161

* cited by examiner

Primary Examiner—Bruce F. Bell
(74) Attorney, Agent, or Firm—Bierman, Muserlian and Lucas

(57) ABSTRACT

The invention relates to a novel rhodium sulfide catalyst for the reduction of oxygen in industrial electrolyzers. The catalyst is highly resistant towards corrosion and poisoning by organic species, thus resulting particularly suitable for use in aqueous hydrochloric acid electrolysis, when technical grade acid containing organic contaminants is employed.

4 Claims, 8 Drawing Sheets

RHODIUM ELECTROCATALYST AND METHOD OF PREPARATION

This application is a continuation of U.S. patent application Ser. No. 09/320,900 filed May 27, 1999, now U.S. Pat. No. 6,149,782.

FIELD OF THE INVENTION

The invention relates to a novel rhodium sulfide catalyst for reduction of oxygen in industrial electrolyzers. The catalyst is highly resistant towards corrosion and poisoning by organic species, thus resulting particularly suitable for use in aqueous hydrochloric acid electrolysis, also when technical grade acid containing organic contaminants is employed.

STATE OF THE ART

The electrolysis of aqueous HCl solutions is a well known method for the recovery of high-value chlorine gas. Aqueous hydrochloric acid is an abundant chemical by-product, especially in chemical plants making use of chlorine as a reactant: in this case, the chlorine evolved in the anodic compartment of the electrolyzer can be recycled as a feedstock to the chemical plant. Electrolysis becomes extremely attractive when the standard hydrogen-evolving cathode is substituted with an oxygen-consuming gas diffusion electrode due to the significant drop in energy consumption. The ability of the gas diffusion electrode to operate successfully in this context is crucially dependent on the nature and performance of the catalyst, and also on the structure of the gas diffusion electrode. Platinum is generally acknowledged as the most effective catalyst for the electroreduction of oxygen in a wide range of conditions; the activation of gas diffusion electrodes with platinum based catalysts is well known in the art, and finds widespread application in fuel cells and electrolyzers of many kinds. However, the case of aqueous HCl electrolysis poses some serious drawbacks to the use of platinum as cathodic catalyst, as it is inevitable for the gas diffusion cathode to come at least partially in contact with the liquid electrolyte, which contains chloride ion and dissolved chlorine. First of all, platinum is susceptible to chloride ion poisoning which negatively affects its activity toward oxygen reduction; a second source of poisoning is constituted by contaminant species, especially organic species, which are in most of the cases dissolved in the by-product hydrochloric acid undergoing electrolysis. Even more importantly, the combined complexing action of hydrochloric acid and dissolved chlorine gas changes the platinum metal into a soluble salt which is dissolved away, making this material inappropriate for use in gas diffusion electrodes. Furthermore, extremely careful precautions have to be taken during the periodical shut-downs of the electrolyzers, otherwise the sudden shift in the cathodic potential, combined with the highly aggressive chemical environment, causes the dissolution of a significant amount of catalyst, and the partial deactivation of the remaining portion. While tailored procedures for planned shut-downs of the electrolyzers can be set up for additional costs, little or nothing can be done in the case of a sudden, uncontrolled shut-down due to unpredictable causes like power shortages in the electric network.

Other platinum group metals appear to follow a similar fate. For example, according to Pourbaix' Atlas of Electrochemical Equilibria in Aqueous Solutions, finely divided rhodium metal dissolves in hot concentrated sulphuric acid, aqua regia, and oxygenated hydrochloric acid. Similarly, (hydrated) $Rh_2O_3 \cdot 5H_2O$ dissolves readily in HCl and other acids. These problems have been partially mitigated with the disclosure of the rhodium/rhodium oxide based catalyst described in concurrent U.S. patent application Ser. No. 09/013,080, filed Jan. 26, 1998, now U.S. Pat. No. 5,958,197. In particular, the rhodium/rhodium oxide system, although slightly less active than platinum towards oxygen reduction, is not poisoned by chloride ions. Also the chemical resistance to aqueous hydrochloric acid with small amounts of dissolved chlorine is sensibly enhanced with respect to platinum. However, an activation step is needed to obtain a sufficiently active and stable form, of this catalyst, and some limitations arise when such a catalyst has to be included in a gas diffusion electrode; for instance, the chemical and electronic state of the catalyst is changed upon sintering in air, a very common step in gas diffusion electrode preparations known in the art. Cumbersome and/or costly operations have to be carried out to replace this step, or to restore the active and stable form of the catalyst afterwards, as disclosed in U.S. Pat. No. 5,958,197. There is no evidence that rhodium/rhodium oxide based catalysts are more insensitive to contaminants with respect to platinum based catalysts.

OBJECTS OF THE INVENTION

It is an object of the invention to provide a novel catalyst for oxygen reduction having desirable and unexpected chemical stability towards highly corrosive media.

It is another object of the invention to provide a novel catalyst for oxygen reduction having desirable and unexpected electrocatalytic activity in presence of organic contaminants.

It is another object of the invention to provide novel gas diffusion electrodes with a novel catalyst therein having desirable and unexpected electrocatalytic properties.

It is another object of the invention to provide a novel electrolytic cell containing a gas diffusion electrode of the invention and to provide an improved method of electrolysing hydrochloric acid to chlorine.

These and other objects and advantages of the invention will become obvious from the following detailed description.

THE INVENTION

The novel electrochemical catalyst of the invention is comprised of rhodium sulfide, which may be either supported on a conductive inert carrier or unsupported. This catalyst does not require any activation step prior to its use, and surprisingly retains all of its electrocatalytic activity towards oxygen reduction in presence of chloride ions and organic molecules. Moreover, the catalyst is surprisingly not dissolved by the complexing action of aqueous hydrochloric acid/chlorine mixtures, thereby requiring no particular precautions during shut-downs when used in hydrochloric acid electrolyzers. The catalyst is preferably coated on at least one side of a web, and may be used alone, with a binder, blended with a conductive support and a binder, or supported on a conductive support and combined with a binder. The binder may be hydrophobic or hydrophilic, and the mixture can be coated on one or both sides of the web. The web can be woven or non-woven or made of carbon cloth, carbon paper, or any conductive metal mesh resistant to corrosive electrolytic solutions.

Examples of high surface area supports include graphite, various forms of carbon and other finely divided supports but carbon black is preferred.

Such catalyst coated webs can be employed as gas diffusion cathodes exhibiting cell voltages, current densities and a lifetime that could not be previously obtained under normal operating conditions, especially when used in highly aggressive environments and with low purity reactants, such as the case of electrolysis of by-product hydrochloric acid.

The catalyst may be easily prepared upon sparging hydrogen sulfide gas in an aqueous solution of a water soluble rhodium salt. Nitrogen gas may be used as a carrier for hydrogen sulfide, and a pure nitrogen flow may advantageously be used to purge excess hydrogen sulfide upon completion of the reaction. The resulting solids are recovered by filtration, washing and drying to constant weight at 125° C., for example. The rhodium sulfide obtained in this way is unsupported (unsupported catalyst). However, when the aqueous solution of the water soluble rhodium salt further contains a suspension of a suitable conductive support, then the rhodium sulfide is preferentially deposited as nanoscopic particles on the surface of the conductive particles (supported catalyst). The resulting form of rhodium sulfide must be heated in an inert atmosphere at 550 to 650° C., and preferably above 600° C. to form a well defined crystalline form of rhodium sulfide catalyst. The heating may be for several hours depending on the size of the batch, and the choice of the temperature is crucial for the formation of a sufficiently stable and active catalyst.

If the temperature is too low such as 300° C., the resulting crystallites are not well-defined and the catalyst stability is not sufficient. If the temperature is too high, i.e., 725° C., the unsupported catalyst has excellent acid stability but does not posses adequate electrochemical activity.

In the following examples, there are described several preferred embodiments to illustrate the invention. However, it is to be understood that the invention is not intended to be limited to the specific embodiments.

EXAMPLE 1

100 grams of supported rhodium sulfide were prepared by the following procedure: 57.3 grams of $RhCl_3·xH_2O$ (39.88% given as rhodium metal) were dissolved in 2 litres of de-ionised (D.I.) water, without any pH adjustment. 53.4 grams of Vulcan XC-72 active carbon were added, and the mixture was slurried with a magnetic stirrer.

Figure 1:
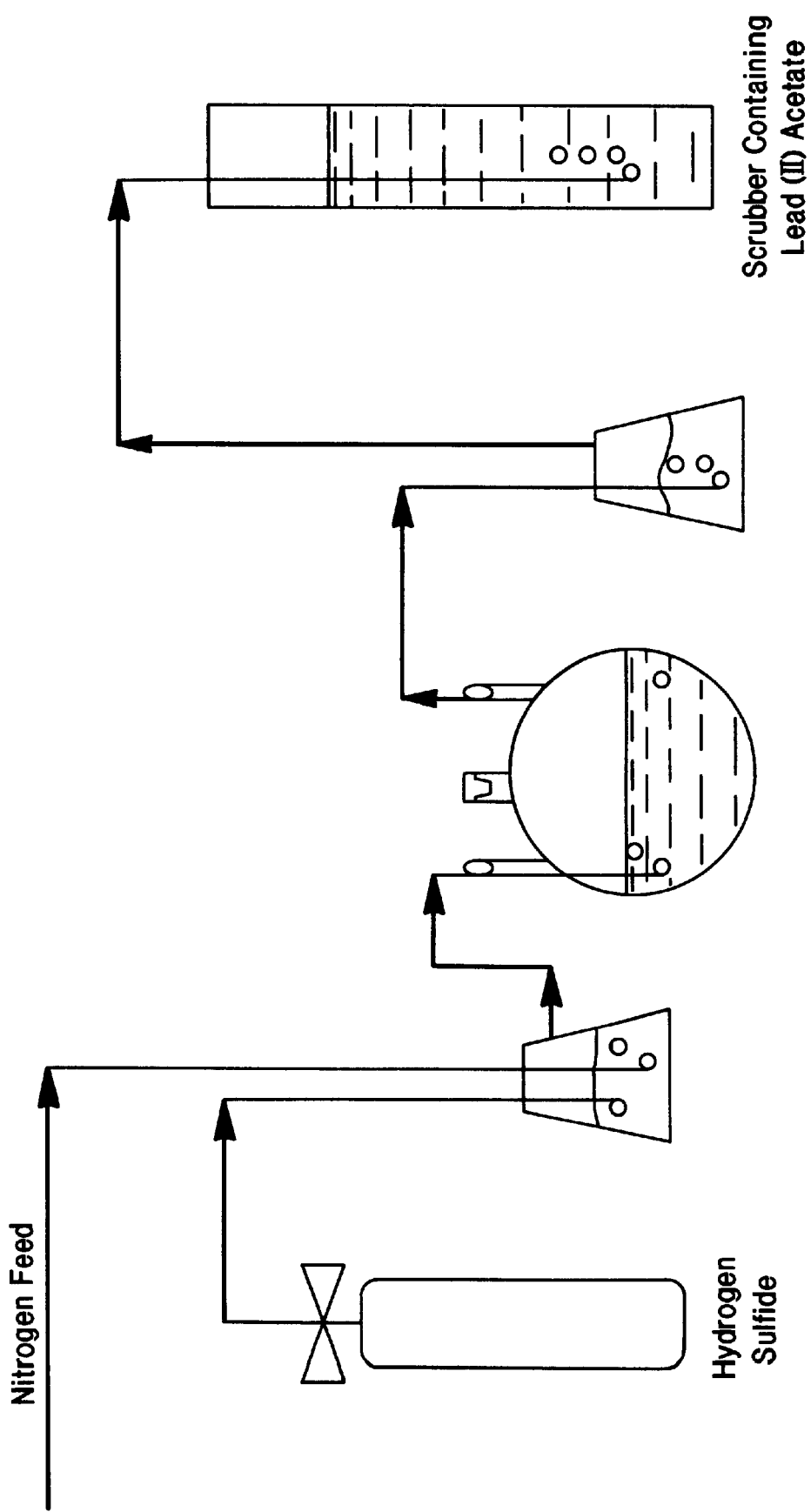
FIG. 1 is a schematic of reaction set-up for the generation of supported or unsupported rhodium sulfide.

Hydrogen sulfide gas was then sparged through the slurry at ambient temperature using nitrogen as a carrier gas, according to the scheme of FIG. 1. The mixture has been allowed to react as described for 7 hours. Upon completion of the reaction, nitrogen was purged through the system to remove residual $H_2S$. The remaining solution was vacuum filtered to isolate the solids, which were then washed with de-ionised water and dried at 125° C. to a constant weight. The resulting catalyst cake was finally ground to a fine powder and subjected to 650° C. under flowing argon for two hours. A load of catalyst on carbon of 27–28%, given as rhodium metal, was obtained.

Figure 2:
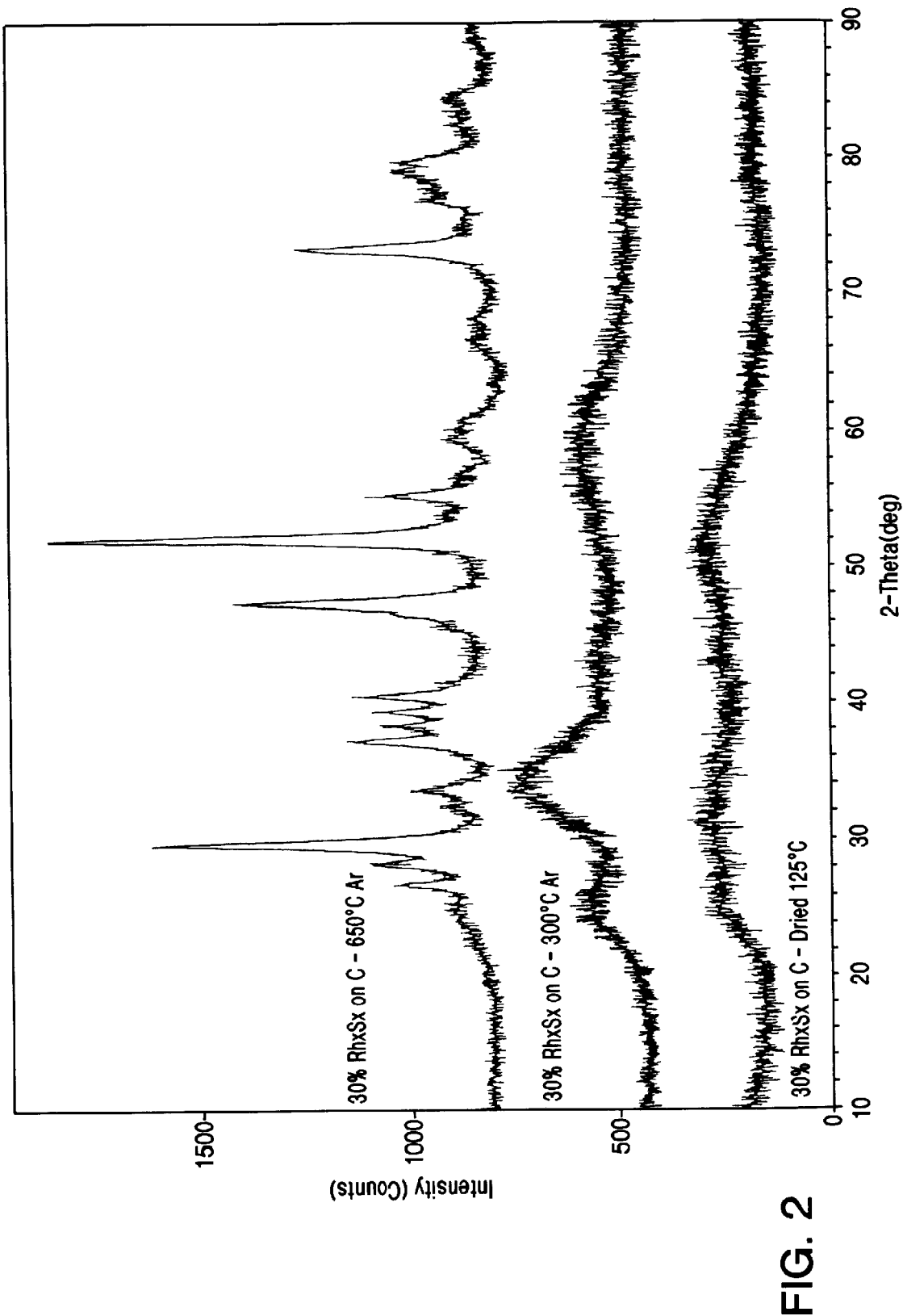
FIG. 2 shows X-ray diffraction patterns for rhodium sulfide precursors as a function of oven temperature. Trace 1: 30% $RhS_x$ on carbon, dried at 125° C. Trace 2: 30% $RhS_x$ on carbon, 300° C. in argon. Trace 3: 30% $RhS_x$ on carbon, 650° C. in argon.

As already stated previously, this final thermal treatment is a crucial step in the preparation of the desired stable and active metal sulfide. FIG. 2 shows the development of a preparation of rhodium sulfide as outlined above as a function of treatment temperature. In particular, FIG. 2 shows the results of a powder sample XRD scan on a.) the supported catalyst after filtration and drying, b.) the supported catalyst of a.) after heating to 300° C. in argon, and c.) the supported catalyst of b.) after heating to 650° C. The increase in number and clarity of peaks in these scans indicates the formation of well-defined crystallites containing rhodium and sulphur. These changes induced in the XRD spectrograph by the temperature treatment also reflect corresponding substantial gains in catalyst stability.

EXAMPLE 2

A final quantity of 6.3 grams of unsupported rhodium sulfide were prepared by the following procedure: 12.1 grams of $RhCl_3·xH_2O$ (39.88% given as rhodium metal) were dissolved in 700 ml of de-ionised water, without any pH adjustment. Hydrogen sulfide gas was then sparged through the slurry at ambient temperature using nitrogen as a carrier gas, according to the scheme of FIG. 1. The mixture was allowed to react as described for 4 hours. Upon completion of the reaction, nitrogen was purged through the system to remove residual $H_2S$. The remaining solution was vacuum filtered to isolate the solids, which were then washed with de-ionised water and dried at 125° C. to a constant weight. The resulting catalyst cake was ground to a fine powder and subjected to 650° C. under flowing argon for two hours.

COMPARATIVE EXAMPLE 1

A rhodium oxide/rhodium catalyst on Vulcan XC-72 was prepared following the method disclosed in co-pending U.S.

Pat. No. 5,958,197 and herebelow repeated. 9.43 g of $RhCl_3 \cdot xH_2O$ (39.88% given as rhodium metal) were dissolved in 2 litres of de-ionised water at room temperature, and the resulting solution was added to a dispersion of 8.75 g of Vulcan XC-72 in 500 ml of D.I. water. The mixture was stirred to maintain a uniform carbon slurry while slowly adding (2–3 ml/min) a 0.5 molar solution of ammonium hydroxide. Besides the 220 ml of ammonium hydroxide theoretically required to form $Rh(OH)_3$, a 20% excess of ammonium hydroxide was added to set a basic environment. The basic slurry was then stirred at 60–70° C. for 30–60 minutes and filtered hot. The filter cake was washed with about 200 ml D.I. water at 60–70° C. and dried in air at 125° C. for 15 hours.

The resulting cake was then ground to a fine powder and heated at 650° C. under flowing argon gas to dehydrate and stabilise the catalyst. The load of catalyst on carbon was 30%, given as rhodium metal. The catalyst powder was further subjected to an activation step by heating at 500° C. for 30 minutes under flowing hydrogen gas to further reduce some of the rhodium oxide to rhodium metal. As emphasised in co-pending U.S. Pat. No. 5,958,197 activation of rhodium-rhodium oxide catalyst is essential to obtain the most active form of this catalyst. Thus, incorporation of this metal—metal oxide catalyst into any of the electrodes of Example 3 requires both a sintering step to form the electrode and then an additional activation step after sintering to recover the lost activity due to sintering.

COMPARATIVE EXAMPLE 2

100 grams of supported platinum sulfide were prepared according to the procedure of the above Example 1, whereby a solution of chloroplatinic acid was employed instead of the rhodium chloride salt.

EXAMPLE 3

The catalysts of all the above reported examples, along with commercially available platinum on Vulcan XC-72 (for example from E-TEK, Inc.), can be utilised in several different configurations. The catalyst of this invention is not limited by the structure of the gas diffusion electrode: for instance, in the present case, each catalyst of the above examples and comparative examples was incorporated in four different types of electrode structure, thereby obtaining sixteen different samples, according to the following procedures:

a). ELAT: A web of carbon cloth with a warp-to-fill ratio of unity and about 25 to 50 yams per inch, and a 97–99% of carbon content was selected from a commercially available product with a thickness of 10 to 15 mils. Carbon cloth with a thickness of 5 to 50 mils could have advantageously been used for this purpose. A mixture of fluorinated polymer (polytetrafluoroethylene, P.T.F.E., commercialised by DuPont under the trademark Teflon® ) and Shawinigan Acetylene Black (SAB) carbon, commercialised by Cabot Corp., was coated on each side of the carbon cloth, air drying at room temperature after each coat, until reaching at a total loading of 8 to 10 mg/cm². A mixture of the powdered catalyst and Teflon® was then applied on one side of the carbon web in multiple coats until obtaining a layer of 0.5 to 2 mg of catalyst per square cm. After the final coat, the carbon cloth was heated to 340° C. for 20 minutes.

b). Single-sided ELAT: The above procedure for preparation of the ELAT was repeated except the SAB/Teflon® mixture was applied to only one side of the carbon cloth, with a loading of 4 to 5 mg/cm². The catalyst coat was applied on the same side, on top of the SAB/Teflon® layer.

c). Flow-through Electrode: A carbon cloth with the same specifications for the ELAT electrode was selected and 2 to 5 coats of a mixture of catalyst powder and Teflon® were applied to one side thereof. The coated fabric was then heated at 340° C. for about 20 minutes to obtain 1.03 mg/cm² of rhodium metal. The final heating step or sintering step is believed to melt the Teflon® and distribute it across the carbon catalyst. However, the sintering step may be successfully omitted for this electrode.

d). Membrane Electrode Assembly: An ink was formulated consisting of approximately 3 parts catalyst and 1 part (as dry weight) Nafion® ionomer, such as that sold by Solutions Technology, (Mendenhall, Penn.) as a suspension in a mixture of water and lower aliphatic alcohols such as methanol, propanol, and/or butanol. The ink was applied to a Nafion® 324 ion exchange membrane, commercialised by DuPont, held in place with a heated vacuum table, via spraying or painting. Other ion exchange membranes known in the art may have alternatively been utilised. Subsequent layers of the ink were applied until depositing 0.05 to 1 mg metal/cm² of catalyst. The assembly was further heated to remove solvents, and assembled with an appropriate electrode backing such as those disclosed in U.S. Pat. No. 6,103,077. The catalyst ink as described could alternatively have been applied to an electrode backing, subsequently heated to remove solvents and assembled with an ion exchange membrane to form an equivalent membrane electrode assembly.

EXAMPLE 4

Prior to incorporation in gas diffusion electrodes, the resistance of this invention's catalyst to corrosive media such as boiling solutions of $HCl/Cl_2$ can be simply determined and compared to prior art catalysts as well as rhodium sulfide prepared at various temperatures. One to five grams of the catalysts of Table 1 were placed in a 250 ml beaker containing 130 g/l chlorine-saturated HCl and heated to boiling. The formation of a deep colour indicates the dissolution of the metal from the catalyst, thus providing evidence for whether the catalyst would be appropriate for use in systems for the recovery of chlorine from aqueous HCl solutions.

TABLE 1

Summary of stability experiments for supported platinum and rhodium compounds, in boiling chlorine-saturated HCl

| Sample | Colour |
|---|---|
| Pt on Vulcan XC-72 (Commercial) | Gold |
| $Pt_xS_x$/C Comparative Example 2 | Yellow |
| $Rh°$-$Rh_2O_3$/C Comparative Example 1 | Rose |
| $Rh_xS_x$/C Example 1, (no heat treatment) | Brown |
| $Rh_xS_x$/C Example 1 | Trace pink, essentially stable |

From this Table it is evident that in order to produce a stable form of rhodium sulfide, some heat treatment step is mandatory. It is also possible to conclude that not all sulfides of precious metals are stable under these conditions, and furthermore, in view of the instability of supported platinum sulfide, it is surprising to find supported rhodium sulfide relatively inert in these conditions.

EXAMPLE 5

Figure 3:
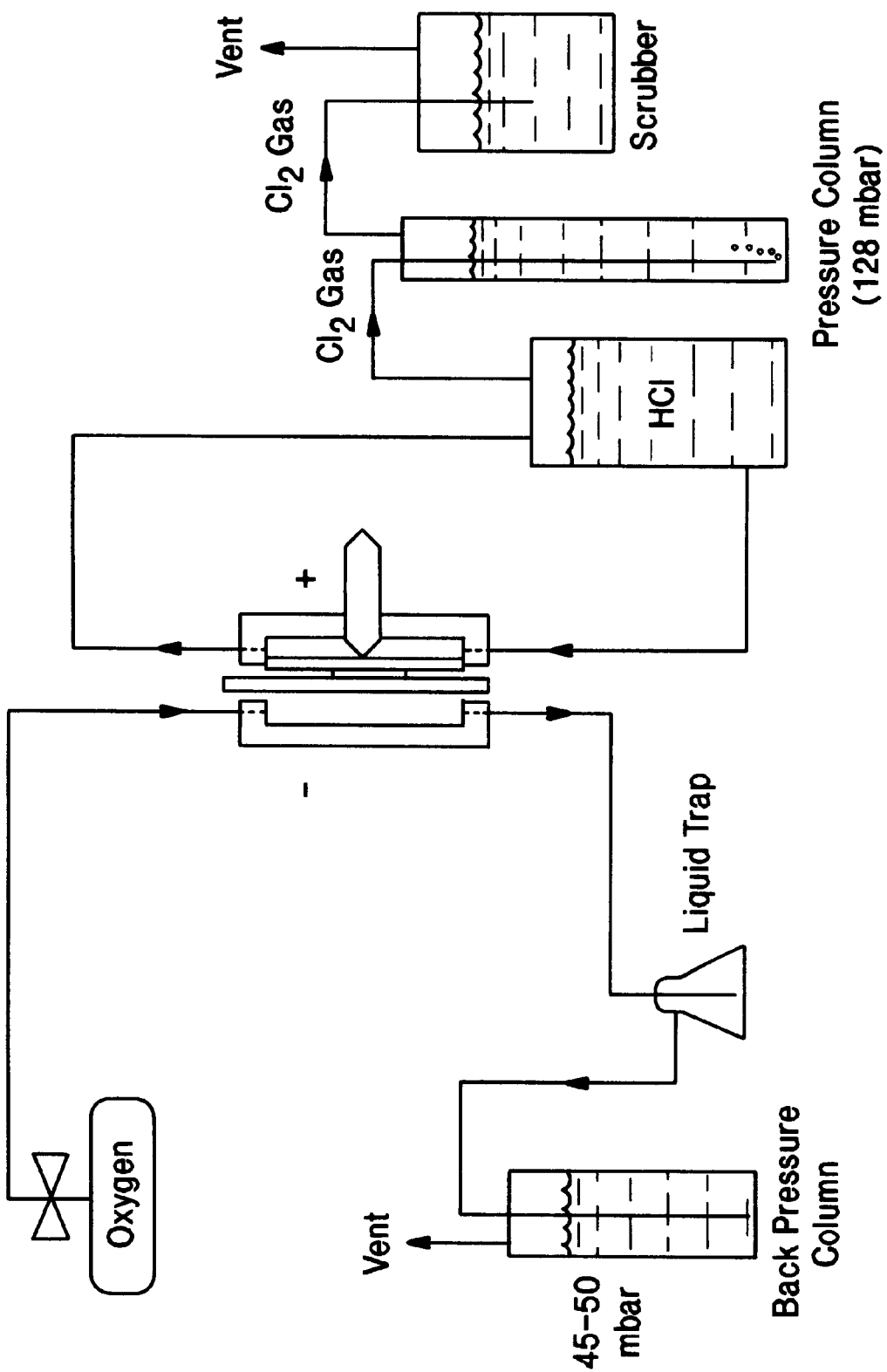
FIG. 3 is a schematic of flow system for the generation of $Cl_2$ from HCl using an oxygen depolarised gas diffusion electrode.

The electrodes of Example 3 were subjected to an electrolysis laboratory test according to the scheme of FIG. 3. This configuration had a 3 mm gap between the cathode and the anode. However, equivalent results were obtained with a "zero-gap" adjustment, where the cathode and the anode were both pressed against the membrane. The exposed electrode surface area was 6.45 cm$^2$ and the membrane was Nafion 324. The anode was titanium mesh activated with ruthenium oxide catalyst. Oxygen was fed to the cathode at a rate of up to five-fold stoichiometric excess at 45–50 mbar pressure and 17% aqueous hydrogen chloride electrolyte (184±10 g/l) was fed to the anode. The said electrolyte was recirculated until 50% of the hydrogen chloride was depleted and then fresh electrolyte was added. The 50% depletion leads to a temporary increase in cell voltage, and is exhibited as "spikes" on a graph of voltage versus time. The electrolyte flow rate was 4 ml per minute or 0.372 m$^3$/hour/m$^2$ at a back-pressure of 120 mbar. Unless stated otherwise, the cells were run at 3 kA/m$^2$ and all voltages were uncorrected for current collector resistance. The temperature of the cell and electrolyte was held at 55° C. +5° C. with heating tape applied to the cell metal end plates and an air conditioning unit.

In commercial electrochemical plants, two common temporary operation modes are encountered which reflect the situations of either scheduled repair or replacement of worn-out components, or the unscheduled failure of these components. For the scheduled shut-downs, one can induce a "controlled" procedure, whereby elements of the plant are systematically turned off or attenuated to a lower operational level. In particular, chlorine can be degassed on the anode side and oxygen can be substituted with nitrogen on the cathode side. Conversely, during the unscheduled failures ("uncontrolled" shut-downs), components of the plant are typically subjected to the most rigorous of operating conditions. In particular, chlorine and oxygen are left in the cell and as a consequence severe corrosion conditions arise. Since it is an object of this invention to provide a catalyst and gas diffusion electrode capable of operation in an electrochemical plant, the catalyst-electrode assemblies were tested in simulated controlled and uncontrolled shut-downs.

Figure 4:
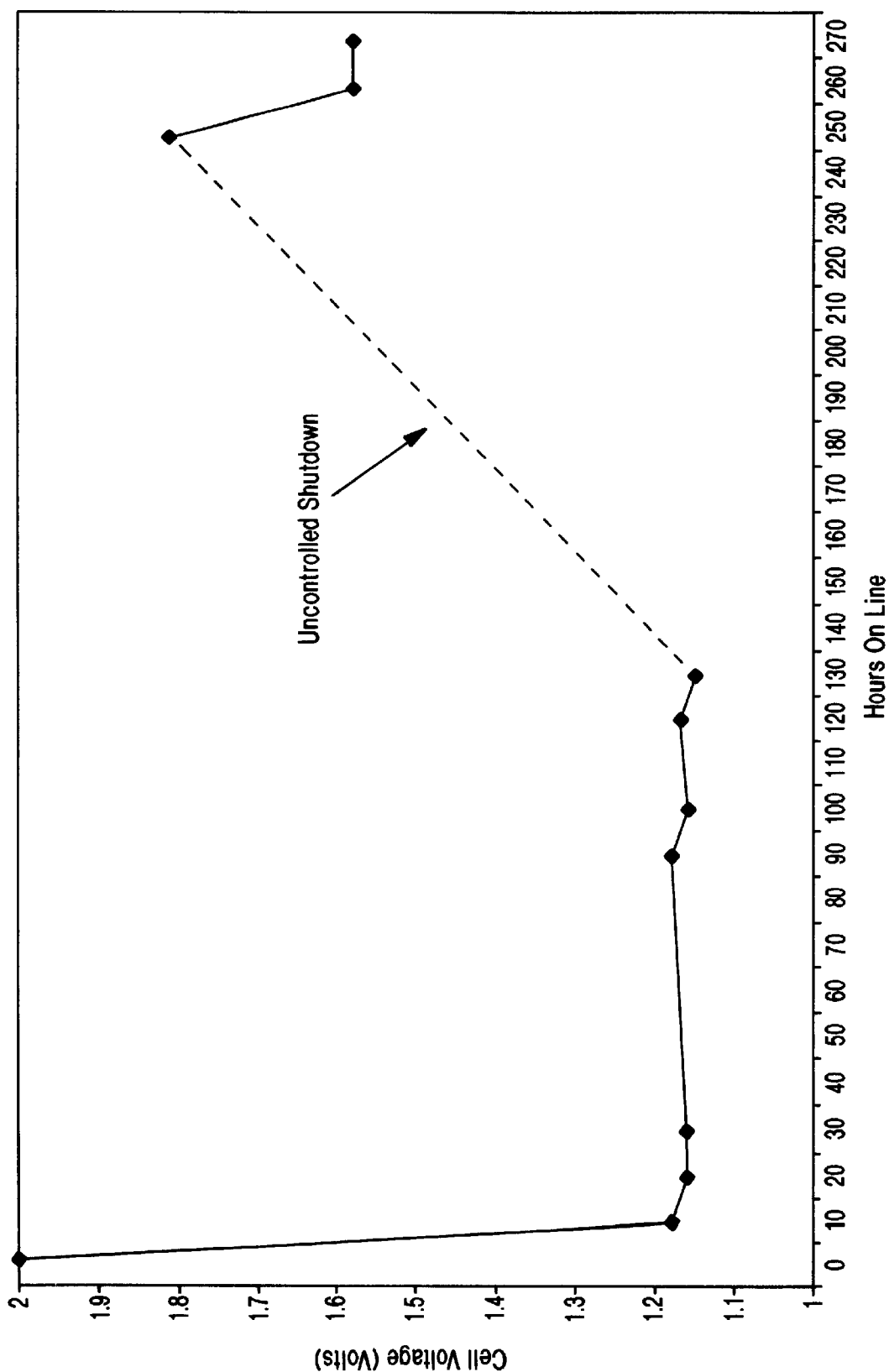
FIG. 4 shows typical platinum catalyst data, incorporated in a standard ELAT® structure with 30% Pt/C, 1.1 mg/cm², coated with 0.70 mg/cm² Nafion, operating in HCl/$Cl_2$ solution at 3 kA/m². ELAT is a trademark of E-TEK, Natick (Mass.), U.S.A., which identifies gas diffusion electrodes comprising a carbon web and a mixture of catalyst and fluorinated binder incorporated therein.
Figure 5:
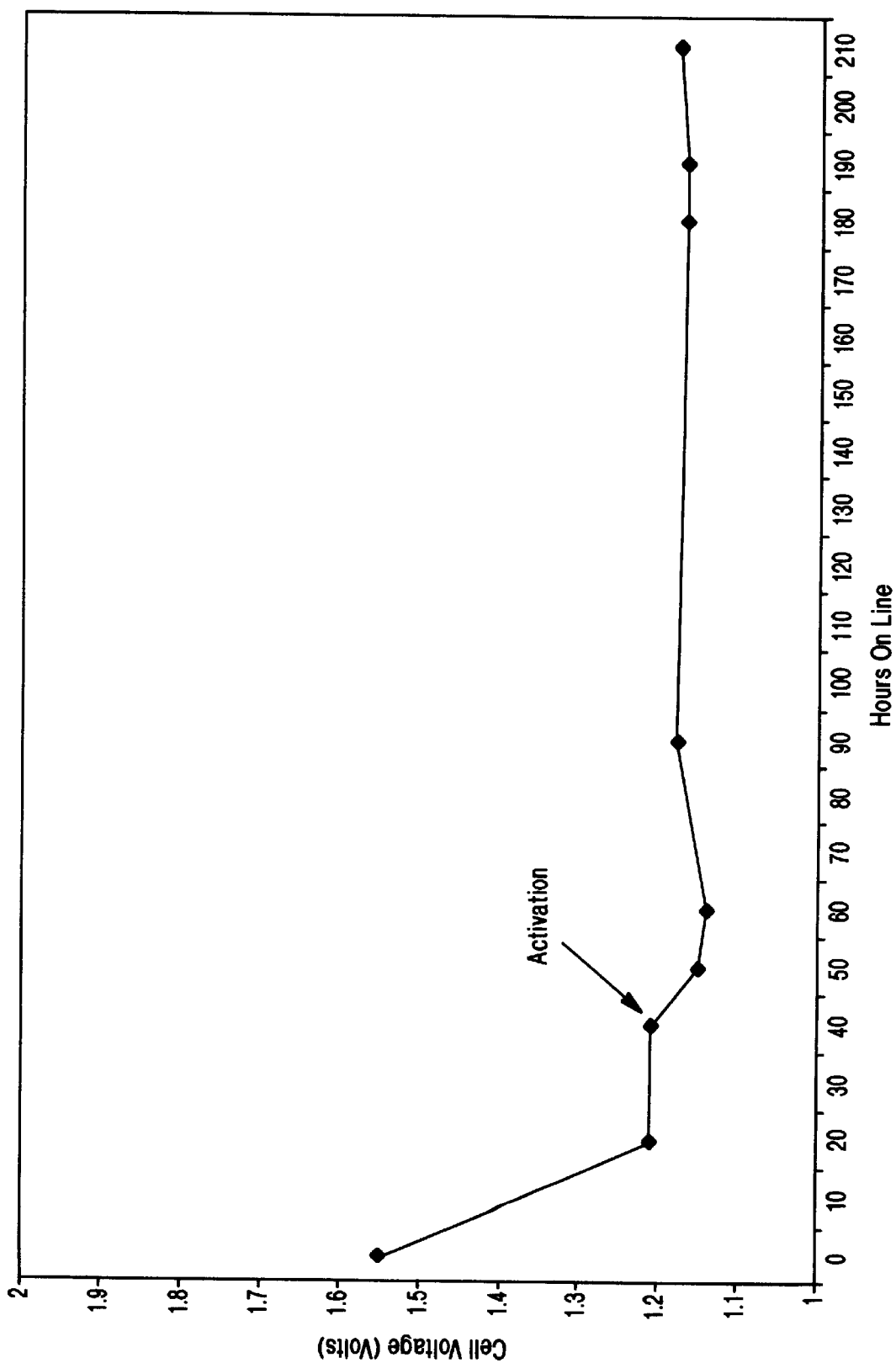
FIG. 5 shows data obtained with rhodium-rhodium oxide, incorporated in a single-sided ELAT® structure with 30% Rh/C, 1.01 mg/cm², coated with 0.70 mg/cm² Nafion, activated with hydrogen, and operating in HCl/$Cl_2$ solution at 3 kA/m².

These two interventions differ in the manner of turning off various components. For the controlled shut-down, an inert gas was fed to the cathode, and the rectifier current was slowly decreased, followed by turning the rectifier off. Once the rectifier was off, the pumps were halted. For the uncontrolled shut-down, oxygen flow was halted to the cathode while the rectifier and pump circuits were suddenly shut off, without the gradual decrease in current or flow rate. The catalyst of this invention was subjected to testing under the uncontrolled shut-down, and compared to current state-of-the art catalysts. FIG. 4 shows the typical platinum catalyst in an ELAT® electrode. While the operating voltage is 1.15 volts, the uncontrolled shut-down causes the catalyst to experience the full corrosive force of the electrolyte, and the cell potential increases by over 500 mV. FIG. 5 shows the case of the rhodium/rhodium oxide of Comparative Example 1, incorporated in a single-sided ELAT, as described in Example 3, paragraph b). Here the initial steady-state voltage is just over 1.2 V, and only after activation does the voltage decrease below 1.2 V to approximately 1.18 V.

Figure 6:
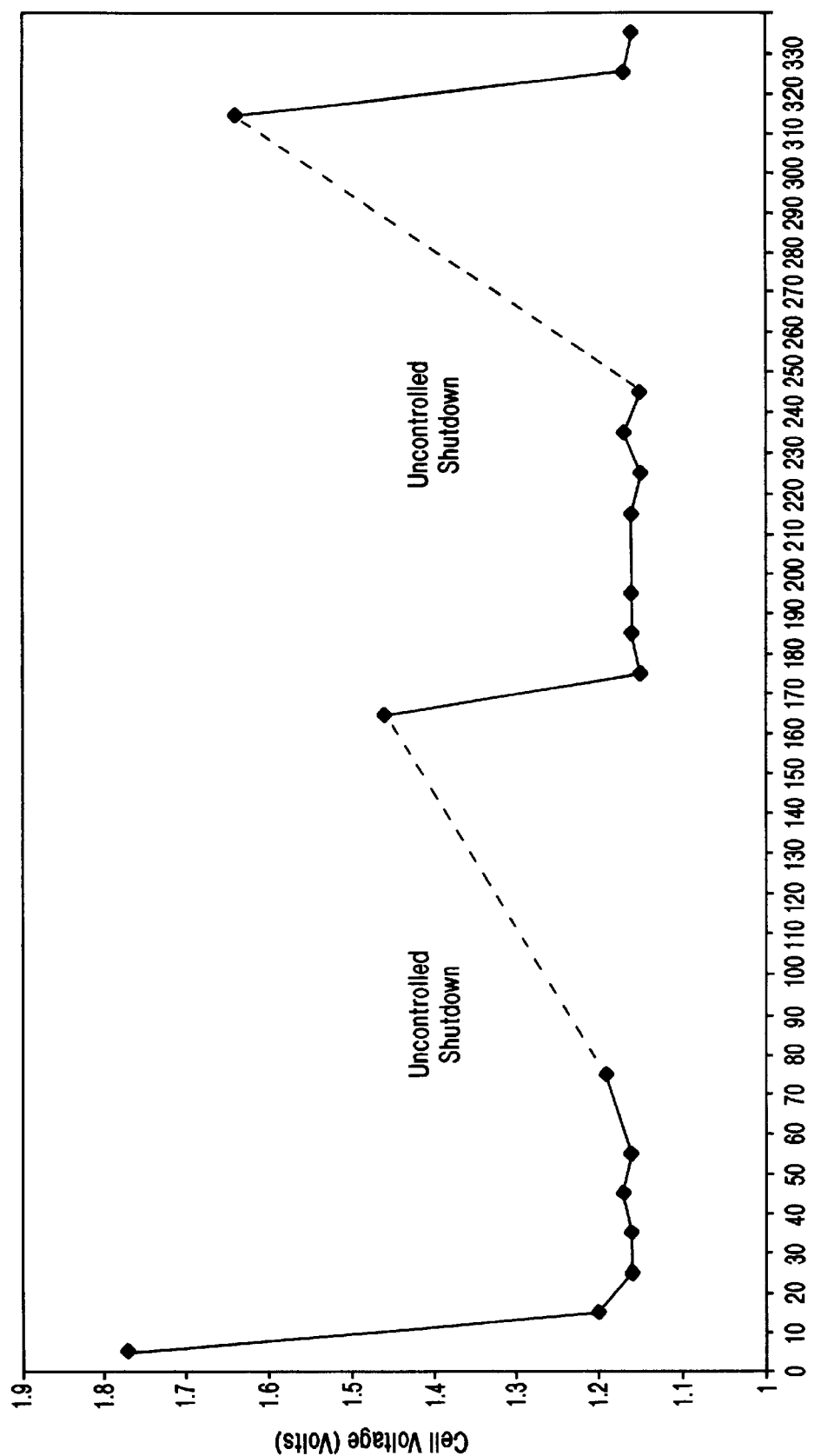
FIG. 6 shows data obtained with 30% $RhS_x$/C, incorporated in a single-sided ELAT® structure with 30% Rh/C, 1 mg/cm², coated with 0.70 mg/cm² Nafion, operating in HCl/$Cl_2$ solution at 3 kA/m².

FIG. 6 is the case of a single-sided ELAT made with the rhodium sulfide catalyst of Example 1, as described in Example 3, paragraph b). The steady-state voltage of 1.15 V was obtained without any form, of activation of the catalyst, either prior to assembly in the electrode or during operation in the laboratory test system. FIG. 6 demonstrates that this new catalyst obtains desirable performance without an additional activation step, and that the catalyst activity is preserved after being exposed to the full corrosive force of solutions of HCl/Cl$_2$.

EXAMPLE 6

Since much of the waste aqueous HCl is generated after chlorinating an organic feedstock, there is often a significant level of organic contaminants in the recycled acid solution. Although one object in the design of oxygen reduction catalysts is to provide a catalyst that yields appreciable activity in the presence of high chloride ion concentrations, it is another goal to provide an oxygen reduction catalyst that yields appreciable activity in the presence of organic contaminants, as already mentioned. Such a catalyst may find utility in other applications as well, such as a cathode in Direct Methanol Fuel Cells (DMFC), whereby methanol crossing over from the anode to the cathode acts as a poison toward the latter when a platinum based state of the art catalyst, such as the commercial product cited in the Example 4, is used. In any case, it is well known that methanol ranks among the organic molecules with the highest activity towards adsorption on transition metals, therefore the behaviour in the presence of methanol of a transition metal-based catalyst is fairly representative of the general attitude of such catalyst to poisoning by organic contaminants. The efficacy of the rhodium sulfide catalyst to reduce oxygen in the presence of organic molecules has been assessed in a potentiostated three-electrode system. The three-electrode or "half cell" method fits 1 cm$^2$ sample of gas diffusion electrode into an inert holder. The gas-fed side of the gas diffusion electrode is positioned into a plenum whereby an excess of air or oxygen is passed at low pressures (on the order of 10 mm of water or less). The face containing the catalyst (that would normally be against the membrane of an electrolyzer or DMFC) is held in a 0.5 M H$_2$SO$_4$ solution at a fixed temperature. The counter electrode is placed directly across the gas diffusion electrode, and a reference electrode is held in-between the two. The fixed geometry is maintained between the three electrodes through a specially constructed cap. A potentiostat is employed to control the potential and measure the current. A current interrupt device is placed in series with the electrodes and the internal resistance (IR) is subtracted from the readings. The direct addition of organic molecules such as methanol to the sulphuric acid solution allows the ready evaluation of catalyst performance in the presence of contaminants.

Figure 7:
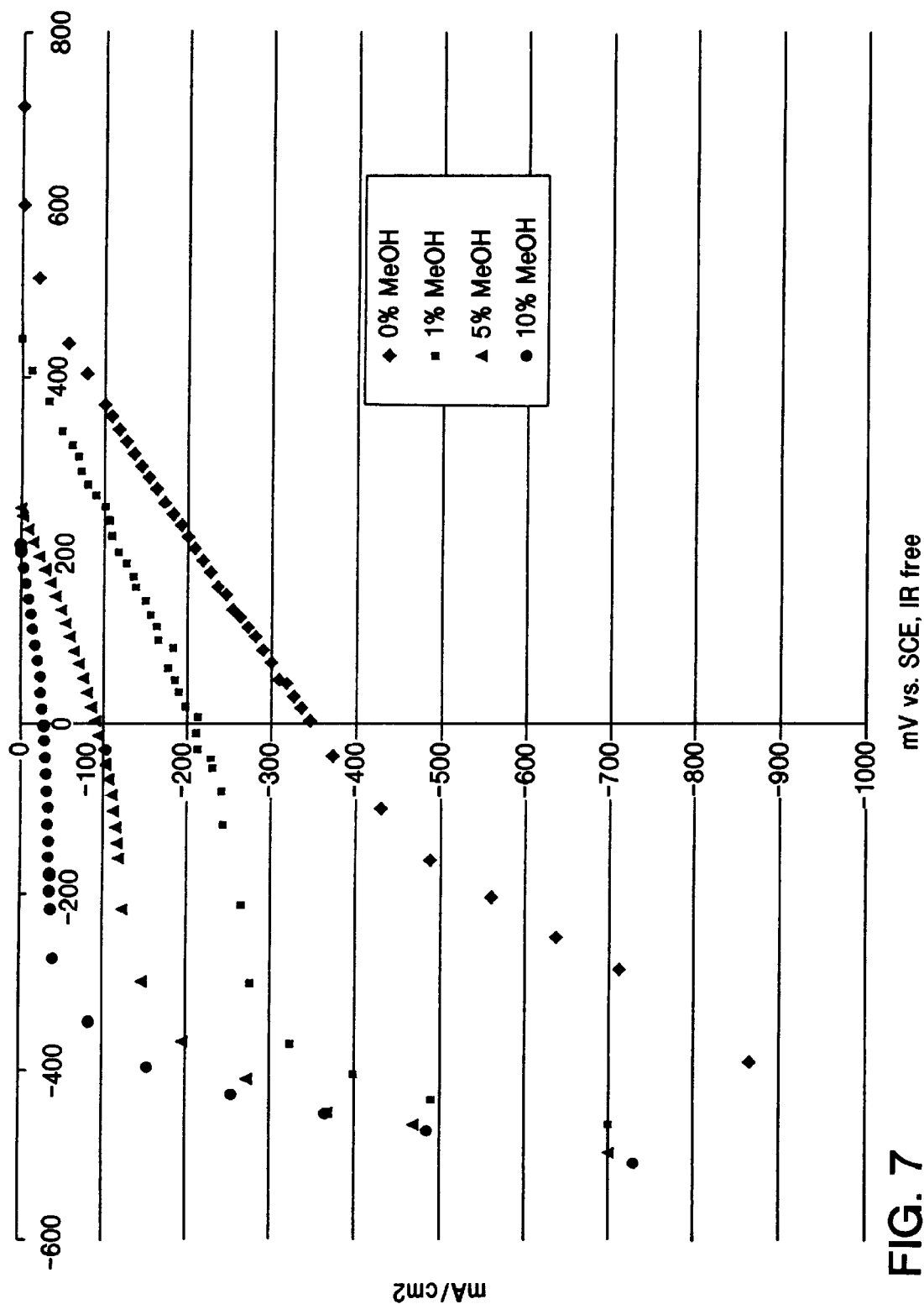
FIG. 7 shows potentiostated current—cathode potential curves for samples of single-sided ELAT® with 1 mg Pt/cm², 30%Pt/C in 0.5 M $H_2SO_4$, at 70+/−2° C., with and without methanol. Methanol is added as 1, 5, or 10% by volume. Platinum foil 3 cm×2 cm serves as the counter electrode. A standard calomel electrode serves as the reference. Reported potentials are corrected for IR using the current interrupt method.
Figure 8:
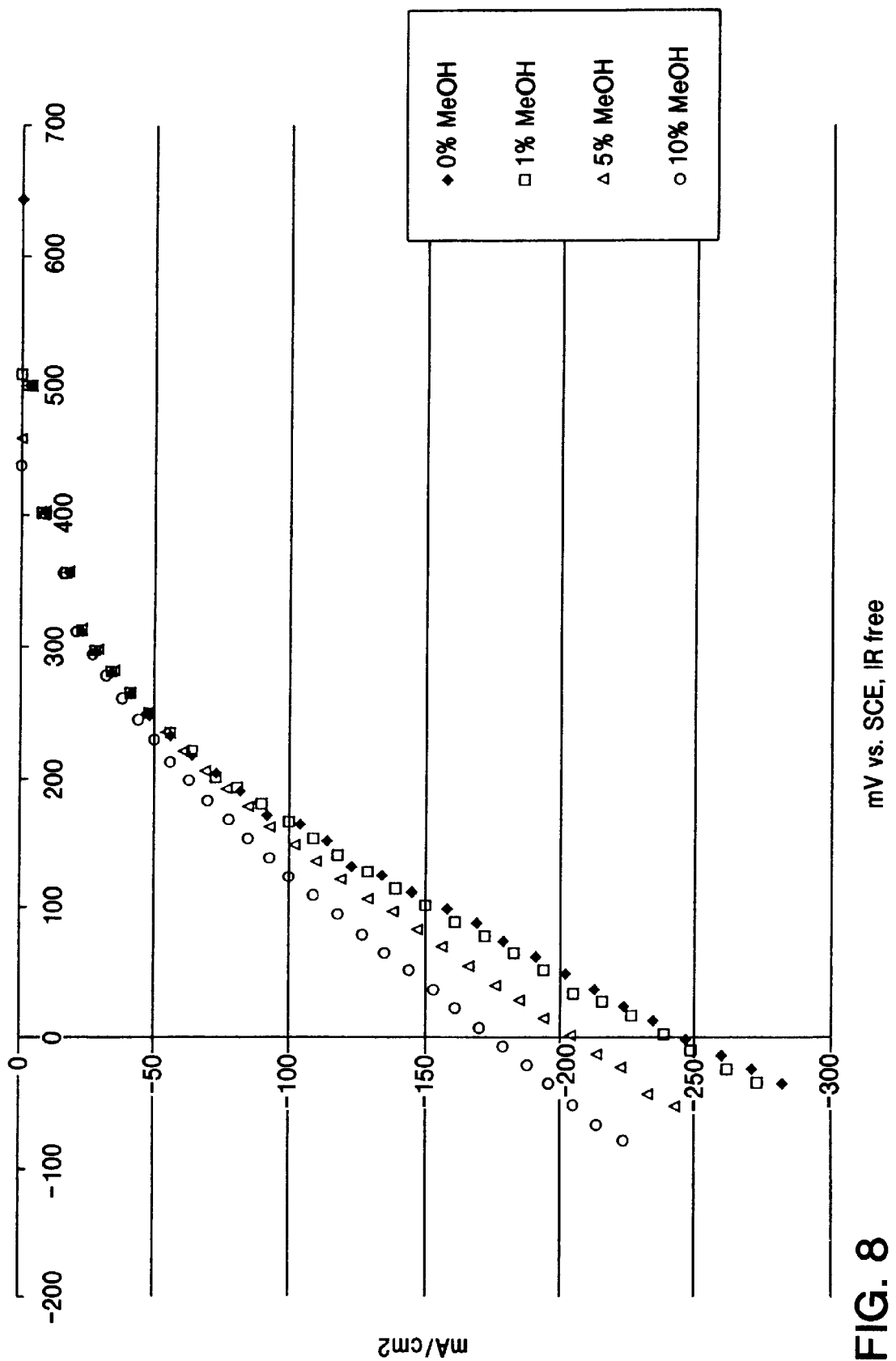
FIG. 8 shows potentiostated current cathode potential curves for a single sided ELAT® with 1.05 mg/cm² Rh, 30%$RhS_x$/C in 0.5 M $H_2SO_4$, at 70+/−2° C., with and without methanol. Methanol is added as 1, 5, or 10% by volume. Platinum foil 3 cm ×2 cm serves as the counter electrode. A standard calomel electrode serves as the reference. Reported potentials are corrected for IR using the current interrupt method.

FIG. 7 shows the case of a single sided ELAT activated with the commercial Pt on Vulcan XC-72 catalyst of Example 4 operated as the cathode under a potential control in the half-cell, at 70° C. and in 0.5 M H$_2$SO$_4$. For each addition of methanol since the very first one, an instant and substantial reduction in oxygen reduction current due to the methanol poisoning can be noticed. FIG. 8 shows the ELAT® of Example 3 paragraph b) activated with the rhodium sulfide catalyst of Example 1, operating under the same regimen. In this case, a shift in cathodic potential was observed only at the highest concentration levels of methanol. These last two figures illustrate the highly selective nature of the rhodium sulfide catalyst inasmuch as the catalyst is able to readily reduce oxygen in the presence of interfering inorganic and organic molecules.

We claim:

1. A sulfur containing catalyst for the electroreduction of oxygen obtainable by sparging a solution of rhodium salt with hydrogen sulfide, recovering and drying the resulting product, grinding the resulting product, and subjecting the ground product to a thermal treatment between 300 and 800° C.

2. The catalyst of claim 1 wherein at least one conductive powder is added to the solution containing a Rh species.

3. The catalyst of claim 1 wherein the conductive powder is a carbon powder.

4. A membrane electrode assembly comprising the catalyst of claim 1.

* * * * *